United States Patent [19]
Patzelt et al.

[11] Patent Number: 5,291,800
[45] Date of Patent: Mar. 8, 1994

[54] MOTOR VEHICLE STEERING WHEEL

[75] Inventors: Helmut Patzelt, Kernen-Stetten; Wolfgang Russ, Gingen/Fils; Joachim Kieserling, Kernen-Rom; Walter Rückert, Esslingen; Klaus Kuhn, Fellbach; Karl Peitsmeier, Remseck; Manfred Link, Waiblingen, all of Fed. Rep. of Germany

[73] Assignee: Mercedes-Benz AG, Fed. Rep. of Germany

[21] Appl. No.: 836,511

[22] Filed: Feb. 18, 1992

[30] Foreign Application Priority Data

Feb. 19, 1991 [DE] Fed. Rep. of Germany ....... 4105026

[51] Int. Cl.⁵ .............................................. B62D 1/08
[52] U.S. Cl. .................................... 74/552; 280/777
[58] Field of Search .............. 29/527.5, 894.1, 894.3, 29/894.33, 894.36, 894.361; 74/552; 280/750, 777

[56] References Cited

U.S. PATENT DOCUMENTS

| | | | |
|---|---|---|---|
| 1,218,753 | 3/1917 | Forg | 74/552 X |
| 1,560,134 | 11/1925 | Beck | 74/552 |
| 1,591,269 | 7/1926 | Beck | 74/552 |
| 1,605,592 | 11/1926 | Kinsey | 74/552 |
| 2,041,739 | 5/1936 | Beck | 74/552 |
| 2,081,729 | 5/1937 | Beck | 74/552 |
| 3,321,996 | 5/1967 | Cardinale | 74/552 |
| 4,359,911 | 11/1982 | Eubanks et al. | 74/552 |
| 4,644,817 | 2/1987 | Albrecht et al. | 74/552 |
| 5,005,863 | 4/1991 | Drefahl | 280/777 |
| 5,060,535 | 10/1991 | Fujita | 74/552 |
| 5,085,097 | 2/1992 | Harata et al. | 74/552 |
| 5,090,731 | 2/1992 | Fujita et al. | 74/552 X |

FOREIGN PATENT DOCUMENTS

| | | |
|---|---|---|
| 0027294 | 4/1981 | European Pat. Off. . |
| 3546065 | 7/1986 | Fed. Rep. of Germany ...... 280/750 |
| 3921333 | 1/1991 | Fed. Rep. of Germany ........ 74/552 |
| 295523 | 8/1928 | United Kingdom . |
| 416041 | 9/1934 | United Kingdom . |
| 489243 | 7/1938 | United Kingdom . |

*Primary Examiner*—Leslie A. Braun
*Assistant Examiner*—Ryan W. Massey
*Attorney, Agent, or Firm*—Evenson, McKeown, Edwards & Lenahan

[57] ABSTRACT

A motor vehicle steering wheel has flat steel deformable spokes which connect a steering-wheel rim to a hub to be mounted on a steering shaft. The associated free ends of the spokes are cast into the cast hub, and each spoke has in the cast-in area a passage bore which extends in the axial direction of the steering wheel and penetrated by the hub material during the casting process. In order to achieve an increase in rigidity in the hub/spokes connecting area, the passage bore is arranged directly adjacent to the entry area of the spoke into the hub, forming a rolling step, such that in this area a tension-rod connection is formed between the hub material located above and below the spoke.

1 Claim, 1 Drawing Sheet

MOTOR VEHICLE STEERING WHEEL

BACKGROUND AND SUMMARY OF THE INVENTION

The present invention relates to a steering wheel for motor vehicles which has deformable flat steel spokes connecting a steering-wheel rim to a hub to be mounted on a steering shaft, and, more particularly, to a steering wheel in which the associated free ends of the spokes are cast into the cast hub, and each spoke has in the cast-in area a passage bore extending in the axial direction of the steering wheel and being penetrated by the hub material during the casting process.

Mercedes-Benz AG has produced vehicle steering wheels in which the passage bore is located in an area of the hub near to the steering shaft and serves as protection against the spoke/hub connection being loosened in the radial direction.

The present invention recognizes that, in the event of a head-on collision, the known steering wheel is loaded by the driver and deformed forwards while absorbing energy in the driving direction. In this situation, it is important that the spokes, on leaving the hub, are held in their position and deform in a defined manner in a foreseen rolling area in a large radius. On leaving the hub, however, the spokes buckle too quickly, for example, due to the breaking up of the cast-around material, the hub material consisting preferably of aluminum, and the steering column located below it then prevents and impedes the advance path of the spokes. The force can then rise, under certain circumstances, to undesired values.

A relatively large dimensioning might provide a possible remedy, but such a remedy cannot always be realized due to the narrow space available in the steering wheel/steering-column jacket area.

The present invention has an object of overcoming the aforementioned disadvantages and ensuring sufficient rigidity in the area in question without increasing the external dimensions of the components involved.

This object has been achieved according to the present invention in a steering wheel by arranging the passage bore directly adjacent to the entry area of the spoke into the hub to form a rolling step, such that in this entry area a tension-rod connection is formed between the hub material located above and below the spoke.

BRIEF DESCRIPTION OF THE DRAWINGS

These and further objects, features and advantages will become more apparent from the following detailed description of a presently preferred embodiment of the invention when taken in conjunction with the accompanying drawings wherein.

DETAILED DESCRIPTION OF THE DRAWINGS

Figure 1:
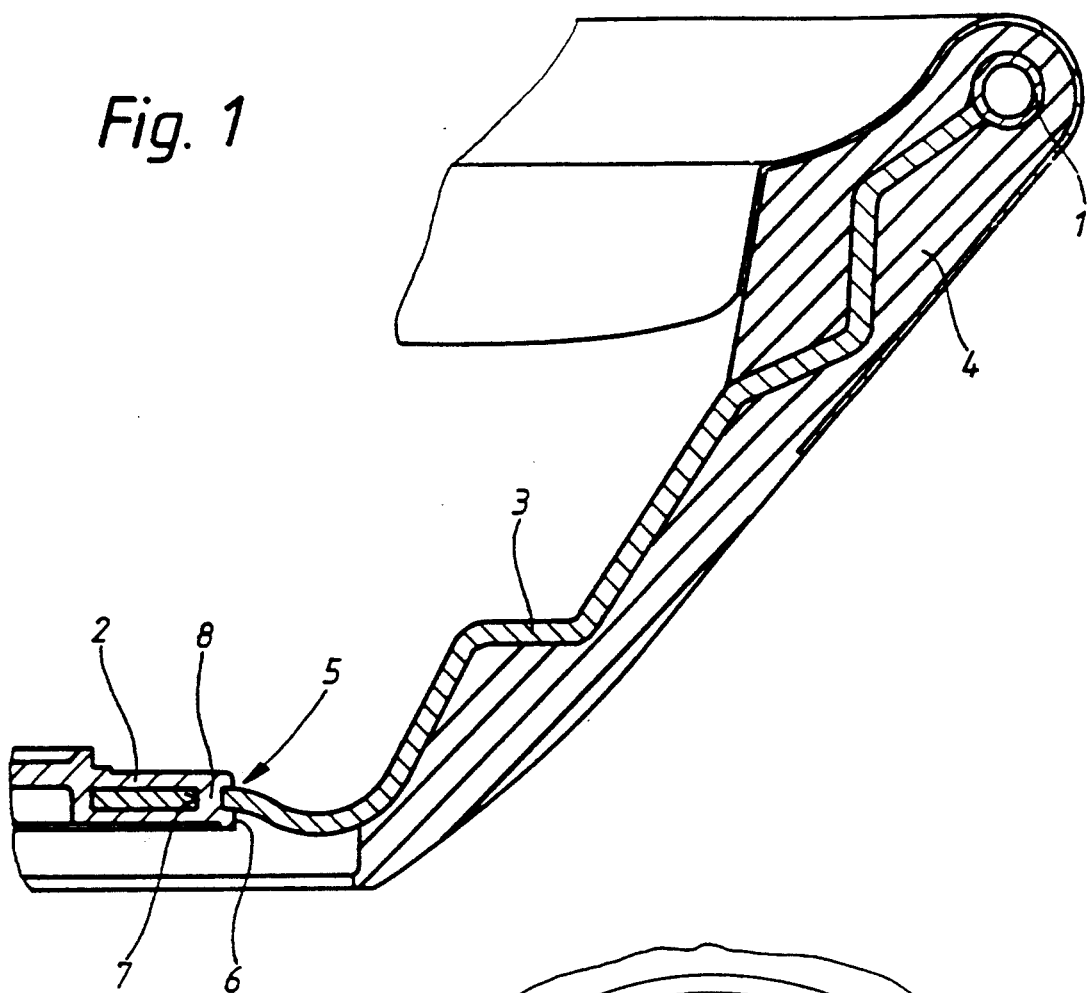
FIG. 1 is a vertical sectional view through a portion of the steering wheel in a spoke area.
Figure 2:
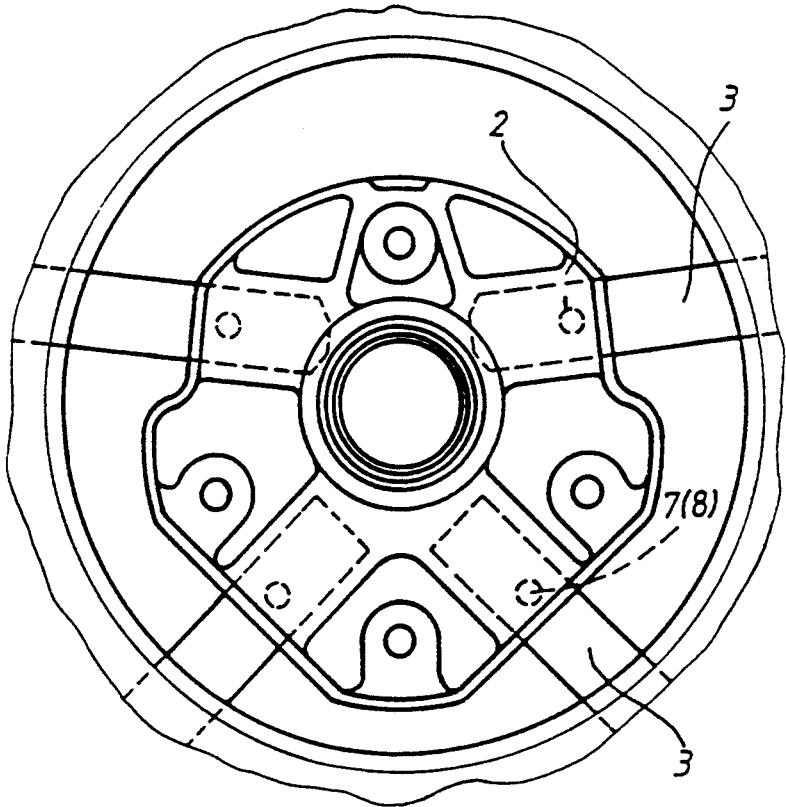
FIG. 2 is a top view of the central hub area of the steering wheel but on a smaller scale.

The steering wheel illustrated in FIGS. 1 and 2 consists essentially of a steering-wheel rim 1 and deformable spokes 3 connecting the rim to a cast hub 2 formed of flat steel material. The steering-wheel rim 1 and the outside of the spokes 3 are covered with a foamed material 4.

The spoke 3 has a passage bore 7 extending in the axial direction of the steering wheel directly adjacent to the entry area 5 of the spoke 3 into the hub 2, which at this point forms a rolling step 6 on the underside of the spoke 3. By way of the hub material which penetrates this passage bore 7 during the casting process, a tension-rod 8 or the like is formed which connects the hub material extending above and below the spoke 3 and thus contributes to a substantial increase in rigidity in this highly loaded area. The tension-rod 8 and the rolling step 6 cooperate to decrease the concentration of stresses that would exist in the spoke 3 if sufficient pressure is placed on the rim 1.

As shown in FIG. 1, the tension rod 8, which passes through the passage bore 7, is in relatively close proximity to the rolling step 6, thus allowing the tension rod 8 to transfer some of the deformation force applied to the rolling step 6 to an upper portion (i.e., the portion opposite to the underside) of the hub 2 so as to provide sufficient rigidity in this area of the hub.2 without increasing external dimensions of the components.

As shown in FIGS. 1 and 2, the rolling step 6 is a substantially annular projection at the end portion of the hub 2 at the point where the spoke 3 is inserted into the hub (i.e. around the outer peripheral edge of the hub 2). Also as shown in FIG. 1, the rolling step 6 is the portion of the end of the hub 2 that extends from the underside of the hub 2 to the underside of the spoke 3 forming a segment at the end of the hub 2 that increases the effective thickness of the hub 2 at the insertion point of the spokes to allow the spoke 3 to roll around the hub 2 in the event of a head-on collision when the steering wheel 1 experiences force from impact of the driver.

At the attachment point between the hub 2 and the spoke 3, the spoke 3 curves gradually away from the rim 1. The curvature of the spoke 3 gradually changes such that the spoke 3 curves towards the rim 1 at a predetermined distance from the hub 2. The gradual curving of the spoke 3 away from the hub 2 and change in curvature of the spoke 3 to curve towards the rim 1 is shown in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle steering wheel, comprising a steering-wheel rim, a cast hub, flat steel deformable spokes connecting the steering-wheel rim to the cast hub for mounting on a steering shaft, associated free ends of the spokes being cast into the cast hub in a cast-in area, and each spoke having in the cast-in area a passage bore which extends in an axial direction of the steering wheel and is penetrated by hub material during the casting process to form a tension-rod connection between hub material located above and below the spoke at the entry area of said spoke into the hub, wherein said passage bore is arranged directly adjacent to the entry area of the spoke into the hub, said hub having a rolling step at the outer peripheral edge of the hub on the underside of the hub, a portion of said spoke immediately curving away from the rim in a gradual manner at the rolling step, the spoke gradually continuing to curve as a function of distance from the hub such that the spoke curves towards the rim at a predetermined distance from the hub, whereby said curvature of said spoke in cooperation with said rolling step permits said spoke to deform in a defined manner having a large radius.

* * * * *